(12) United States Patent
Minami et al.

(10) Patent No.: US 7,798,205 B2
(45) Date of Patent: Sep. 21, 2010

(54) HEAT EXCHANGER AND METHOD OF MANUFACTURING THE SAME

(75) Inventors: Kazuhiko Minami, Oyama (JP); Takenori Hashimoto, Oyama (JP)

(73) Assignee: Showa Denko K. K., Tokyo (JP)

( * ) Notice: Subject to any disclaimer, the term of this patent is extended or adjusted under 35 U.S.C. 154(b) by 980 days.

(21) Appl. No.: 11/596,622

(22) PCT Filed: Jul. 27, 2005

(86) PCT No.: PCT/JP2005/014237
§ 371 (c)(1),
(2), (4) Date: Nov. 15, 2006

(87) PCT Pub. No.: WO2006/011653
PCT Pub. Date: Feb. 2, 2006

(65) Prior Publication Data
US 2008/0041571 A1 Feb. 21, 2008

Related U.S. Application Data

(60) Provisional application No. 60/598,539, filed on Aug. 4, 2004.

(30) Foreign Application Priority Data
Jul. 29, 2004 (JP) .............................. 2004-221861

(51) Int. Cl.
*F28F 13/18* (2006.01)

(52) U.S. Cl. .................... 165/133; 165/134.1; 165/151; 29/890.047

(58) Field of Classification Search ................. 165/133, 165/134.1, 151; 29/890.047
See application file for complete search history.

(56) References Cited

U.S. PATENT DOCUMENTS

| 4,741,393 | A | * | 5/1988 | Collier | 165/133 |
| 5,011,547 | A | * | 4/1991 | Fujimoto et al. | 148/24 |
| 5,544,698 | A | * | 8/1996 | Paulman | 165/133 |
| 6,234,238 | B1 | * | 5/2001 | Koyama et al. | 165/78 |
| 2006/0086486 | A1 | * | 4/2006 | Sudo | 165/143 |
| 2009/0260794 | A1 | * | 10/2009 | Minami et al. | 165/182 |

FOREIGN PATENT DOCUMENTS

| JP | 11 140572 | 5/1999 |
| JP | 2003 326359 | 11/2003 |

* cited by examiner

*Primary Examiner*—Terrell L McKinnon
(74) *Attorney, Agent, or Firm*—Oblon, Spivak, McClelland, Maier & Neustadt, L.L.P.

(57) ABSTRACT

In a heat exchanger having a core portion in which aluminum flat tubes and aluminum fins are disposed alternatively and brazed with each other, each fin has one side portion located at one side of the tube and the other side portion located at the other side of the tube. The one side portion of the fin is higher in pitting potential than the other side portion of the fin, and the pitting potential difference between the one side portion of the fin and the other side portion of the fin is 40 to 200 mV. The pitting potential difference can be formed by the Zn concentration difference in the aluminum alloy constituting the fin.

14 Claims, 3 Drawing Sheets

HEAT EXCHANGER AND METHOD OF MANUFACTURING THE SAME

CROSS REFERENCE TO RELATED APPLICATIONS

This application is an application filed under 35 U.S.C. §111(a) claiming the benefit pursuant to 35 U.S.C. §119(e)(1) of the filing date of U.S. Provisional Application No. 60/598, 539 filed on Aug. 4, 2004, pursuant to 35 U.S.C. §111(b).

This application claims priority to Japanese Patent Application No. 2004-221861 filed on Jul. 29, 2004 and U.S. Provisional Application No. 60/598,539 filed on Aug. 4, 2004, the entire disclosures of which are incorporated herein by reference in their entireties.

TECHNICAL FIELD

The present invention relates to a heat exchanger to be manufactured by brazing, and more particularly to a heat exchanger capable of demonstrating excellent fin strength even in the case of an occurrence of fin corrosion. It also relates to a method of manufacturing the heat exchanger.

In this disclosure, the wording of "aluminum" is used to include the meaning of aluminum and its alloy. Furthermore, the wording of "Al," "Mn," and "Zn" denotes metal simple substance, respectively.

BACKGROUND ART

Conventionally, as a heat exchanger for use in a vehicle such as an automobile, an aluminum laminate type heat exchanger having a core portion with flat tubes and fins disposed alternatively has been widely used. In such a heat exchanger, it is required to demonstrate heat exchanging performance even in the case of an occurrence of fin corrosion, and also required to have certain strength against chippings, etc. In general, after the occurrence of fin corrosion, the fin strength deteriorates due to intergranular corrosion.

In order to attain excellent material strength even in the case of an occurrence of fin corrosion, it has been known to use an aluminum alloy brazing sheet as a heat exchanger fin improved in intergranular corrosion resistance by regulating chemical composition of the core material and skin material. Also proposed is a method of preventing intergrannular corrosion of fins by regulating brazing conditions (see Japanese Unexamined Laid-open Patent Publication Nos. H11-140572 and 2003-326359).

However, the aforementioned methods of preventing intergranular corrosion could not sufficiently improve the self-corrosion resistance of fins, and therefore the fin strength could not be maintained under a severe condition exceeding a certain corrosion environment level.

In view of the aforementioned background technique, the present invention aims to provide a heat exchanger excellent in strength even in the case of an occurrence of corrosion, especially a heat exchanger having an excellent fin strength of a heat exchanger core front side requiring chipping proof performance. It also aims to provide a method of manufacturing the heat exchanger.

DISCLOSURE OF INVENTION

To attain the aforementioned objects, the heat exchanger according to the present invention has the following structure as recited in the following Items [1] to [9].

[1] A heat exchanger having a core portion in which aluminum flat tubes and aluminum fins are disposed alternatively and brazed with each other, each fin having a one side portion located at one side of the tube and the other side portion located at the other side of the tube, wherein the one side portion of the fin is higher in pitting potential than the other side portion of the fin, and wherein the pitting potential difference between the one side portion of the fin and the other side portion of the fin is 40 to 200 mV.

[2] The heat exchanger as recited in the aforementioned Item 1, wherein the pitting potential difference is created by Zn concentration difference in aluminum alloy constituting the fin.

[3] The heat exchanger as recited in the aforementioned Item 2, wherein the Zn concentration difference is 0.4 mass % or more.

[4] The heat exchanger as recited in the aforementioned Item 1, wherein the one side portion of the fin and the other side portion of the fin are constituted by separated fins consisting of one side fin located at one side of the tube and the other side fin located at the other side of the tube, the separated fins being disposed with a distance therebetween along the longitudinal direction of the tube.

[5] The heat exchanger as recited in the aforementioned Item 4, wherein the distance between the one side fin and the other side fin is 3 mm or less.

[6] The heat exchanger as recited in the aforementioned Item 4 or 5, wherein the one side fin is made of aluminum alloy consisting essentially of Mn: 0.8 to 2 mass %, Zn: 0.4 to 2 mass %, and the balance being Al and inevitable impurities, and wherein the other side fin is made of aluminum alloy consisting essentially of Mn: 0.8 to 2 mass %, Zn: 1.5 to 3 mass %, and the balance being Al and inevitable impurities.

[7] The heat exchanger as recited in the aforementioned Item 1, wherein the one side portion of the fin and the other side portion of the fin are made of an integrated single fin, wherein pitting potential difference is formed between the one side portion and the other side portion.

[8] The heat exchanger as recited in the aforementioned Item 7, wherein the one side portion of the fin is made of aluminum alloy consisting essentially of Mn: 0.8 to 2 mass %, Zn: 0.4 to 2 mass %, and the balance being Al and inevitable impurities, and wherein the other side portion of the fin is made of aluminum alloy consisting essentially of Mn: 0.8 to 2 mass %, Zn: 1.5 to 3 mass %, and the balance being Al and inevitable impurities.

[9] The heat exchanger as recited in the aforementioned Item 1, wherein the fin has a thickness of 100 μm or less.

The heat exchanger for use in a vehicle according to the present invention has the following structure as recited in the following Item [10].

[10] A heat exchanger for use in a vehicle, the heat exchanger having a core portion in which aluminum tubes and aluminum fins are disposed alternatively and brazed with each other, each fin having one side portion located at one side of the tube and the other side portion located at the other side of the tube, wherein the one side portion of the fin is higher in pitting potential than the other side portion of the fin, wherein the pitting potential difference between the one side portion of the fin and the other side portion of the fin is 40 to 200 mV, and wherein the heat exchanger is installed on a vehicle with the one side portion of the fin with higher pitting potential facing toward a front side of the vehicle and the other side portion of the fin with lower pitting potential facing toward a rear side of the vehicle.

Furthermore, the method of manufacturing a heat exchanger according to the present invention has the following structure as recited in the following Items [11] to [13].

[11] A method of manufacturing a heat exchanger having a core portion in which aluminum flat tubes and aluminum fins are disposed alternatively and brazed with each other, each fin having one side portion located at one side of the tube and the other side portion located at the other side of the tube, the one side portion of the fin being higher in pitting potential than the other side portion of the fin, the method, comprising the steps of:

provisionally assembling a core portion by alternatively disposing the tubes and the fins; and heating the provisionally assembled core portion in a furnace to braze the tubes and the fins.

[12] A method of manufacturing a heat exchanger having a core portion in which aluminum flat tubes and aluminum fins are disposed alternatively and brazed with each other, each fin having one side portion located at one side of the tube and the other side portion located at the other side of the tube, the one side portion of the fin being higher in pitting potential than the other side portion of the fin, the method, comprising the steps of:

provisionally assembling a core portion by alternatively disposing the tubes and the fins; and heating the provisionally assembled core portion in a furnace in a state in which an Al—Zn alloy plate is disposed neat the other side portion of the fin to braze the tubes and the fins.

[13] A method of manufacturing a heat exchanger having a core portion in which aluminum flat tubes and aluminum fins are disposed alternatively and brazed with each other, each fin having one side portion located at one side of the tube and the other side portion located at the other side of the tube, the one side portion of the fin being higher in pitting potential than the other side portion of the fin, the method, comprising the steps of:

provisionally assembling a core portion by alternatively disposing the tubes and the fins;

applying flux only to the other side portion of the fin of the provisionally assembled core portion; and heating the provisionally assembled core portion to which the flux is applied to the other side portion of the fin in a furnace to braze the tubes and the fins.

EFFECTS OF THE INVENTION

According to the heat exchanger as recited in the aforementioned Item [1], since cathodic protection is given to the one side portion of the fin, the strength deterioration at the one side portion of the fin can be restrained, and therefore certain fin strength can be maintained at the one side portion even after an occurrence of corrosion.

According to the heat exchanger as recited in the aforementioned Item [2], the Zn concentration difference causes pitting potential difference, which restrains strength deterioration at the one side portion of the fin. Furthermore, the Zn contained in the fin can give corrosion protection to the tube.

According to the heat exchanger as recited in the aforementioned Item [3], sufficient corrosion protection can be given to the one side portion of the fin.

According to the heat exchanger as recited in the aforementioned Item [4], since two separated fins are used, it is possible to adjust the pitting potential difference in the fin even before the brazing by adjusting the composition of the fin material.

According to the heat exchanger as recited in the aforementioned Item [5], sufficient cathodic protection effect can be obtained in the heat exchanger using two separated fins disposed between adjacent tubes.

According to the heat exchanger as recited in the aforementioned Item [6], sufficient cathodic protection effect can be obtained in the heat exchanger using two separated fins disposed between adjacent tubes, and the heat exchanger can be excellent in buckling resistance at high temperature due to the Mn contained in the fin.

According to the heat exchanger as recited in the aforementioned Item [7], sufficient cathodic protection effect can be obtained in the heat exchanger using an integrated single fin disposed between adjacent tubes.

According to the heat exchanger as recited in the aforementioned Item [8], sufficient cathodic protection effect can be obtained in the heat exchanger using an integrated single fin disposed between adjacent tubes, and the heat exchanger can be excellent in buckling resistance at high temperature due to the Mn contained in the fin.

According to the heat exchanger as recited in the aforementioned Item [9], the heat exchanger can be excellent in fin strength, lightness, and heat releasing performance.

According to the heat exchanger as recited in the aforementioned Item [10], since certain strength can be maintained at the front side of the fin even in the case of an occurrence of corrosion, damages due to chippings can be decreased.

According to the method of manufacturing the heat exchanger as recited in the aforementioned Item [11], it is possible to manufacture a heat exchanger having pitting potential difference between one side portion and the other side portion of the fin by the material composition adjustment of the two separate fins.

According to the method of manufacturing the heat exchanger as recited in the aforementioned Item [12], the Zn which will evaporate from the Al—Zn alloy plate at the time of heating will diffuse into the fin, and an inclination of Zn concentration depending on the distance from the Al—Zn alloy plate will be generated. As a result, the Zn concentration of the other side portion of the fin near the Al—Zn alloy plate becomes higher and that of the one side portion thereof becomes lower. Therefore, a heat exchanger having a pitting potential difference based on the Zn concentration difference can be provided.

According to the method of manufacturing the heat exchanger as recited in the aforementioned Item [13], since Zn evaporation at the other side portion of the fin to which flux is applied is restrained during the heating step, the Zn concentration becomes relatively higher than the one side portion of the fin. Thus, a heat exchanger having a pitting potential difference based on the Zn concentration difference can be provided.

BRIEF DESCRIPTION OF DRAWINGS

The preferred embodiments of the present invention are shown by way of example, and not limitation, in the accompanying figures, in which.

BEST MODE FOR CARRYING OUT THE INVENTION

Figure 1:
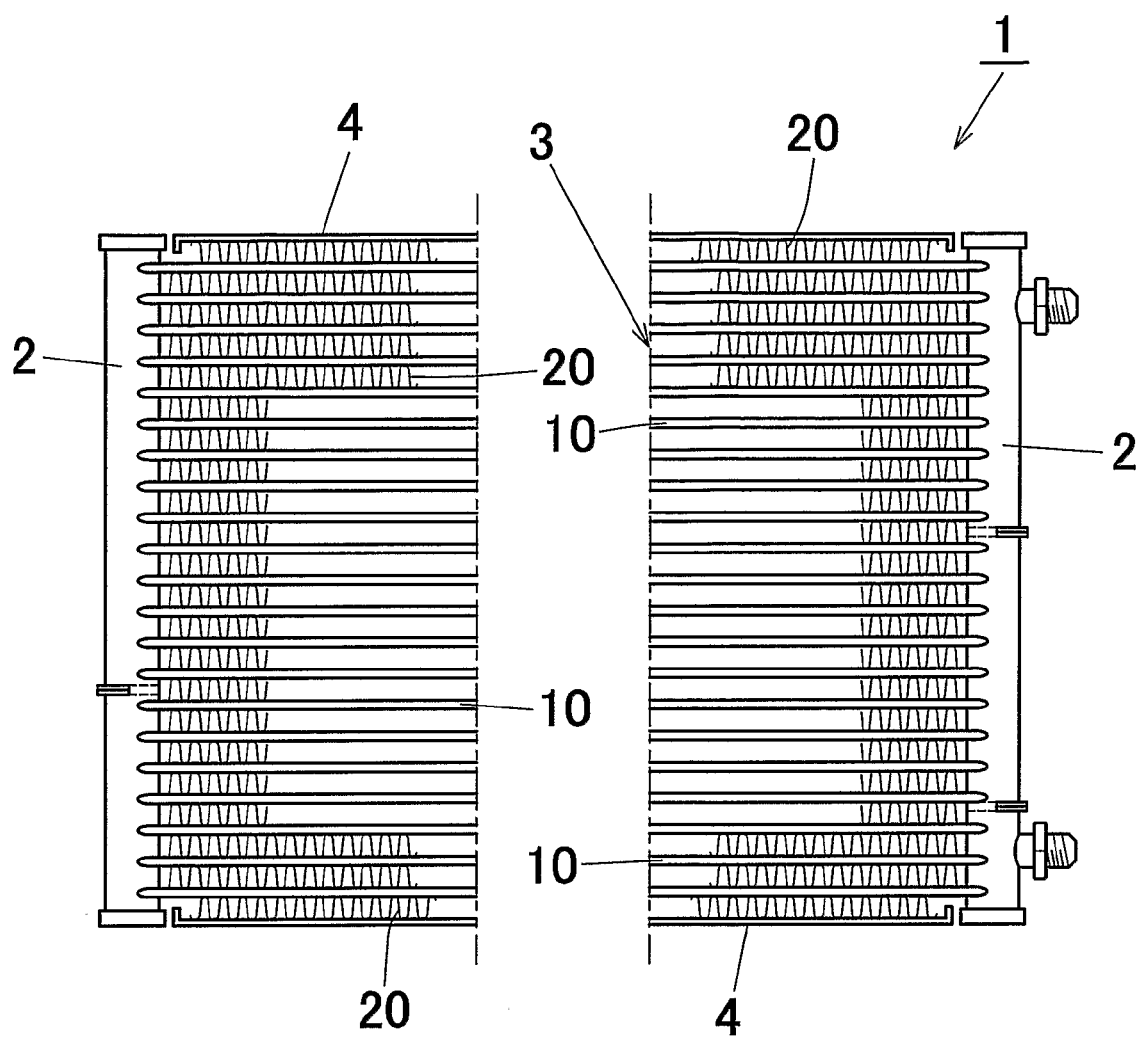
FIG. 1 is a front view of a heat exchanger according to an embodiment of this invention.
Figure 2:
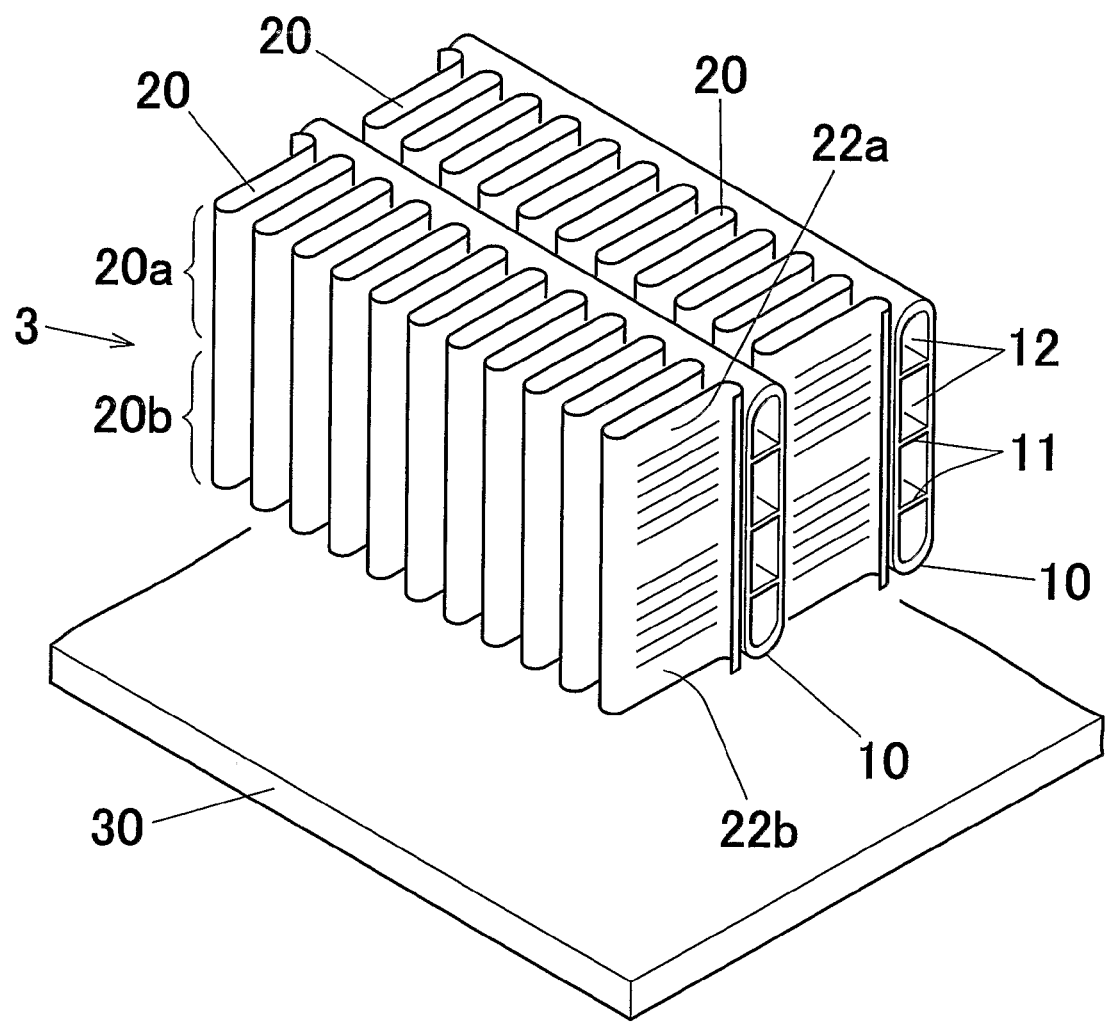
FIG. 2 is a perspective view partially showing a core portion constituting the heat exchanger in which a single fin is disposed between adjacent tubes.
Figure 3:
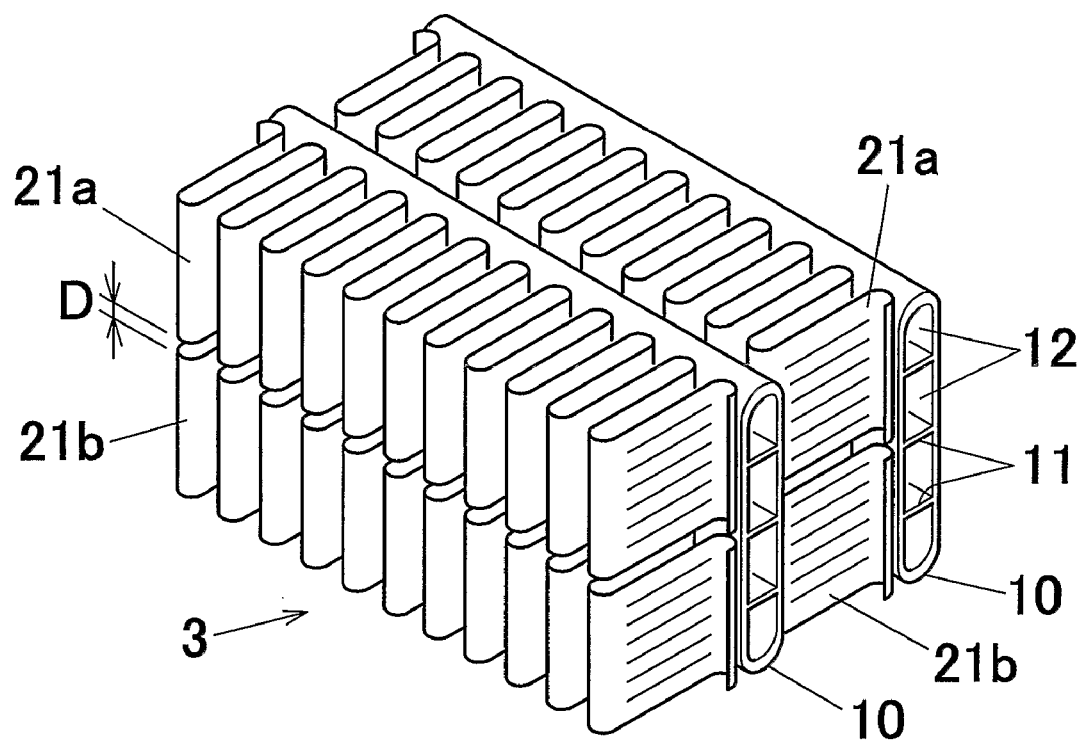
FIG. 3 is a perspective view partially showing a core portion constituting the heat exchanger in which two separated fins arranged in parallel are disposed between adjacent tubes.

FIG. 1 is a front view of a heat exchanger according to an embodiment of this invention. This heat exchanger 1 is the so-called multi-flow type heat exchanger used as a condenser for use in a refrigeration cycle in an automobile air conditioner. FIGS. 2 and 3 show an enlarged principal portion of the heat exchanger shown in FIG. 1 in a brazing position rotated by 90 degrees for an explanation purpose.

In detail, in this heat exchanger 1, between a pair of right and left vertical hollow headers 2 and 2 disposed in parallel with each other, a plurality of heat exchanging tubes 10 are disposed in parallel with their opposite sides fluidly communicated with the hollow headers 2 and 2. A corrugate fin 20 is disposed between adjacent heat exchanging tubes 10 and outside the outermost corrugate fin 20. Outside the outermost corrugate fin 20, a side plate 4 is disposed.

The heat exchanging tube 10 is an aluminum hollow extruded article. As shown in FIG. 2, the inner side thereof is divided by partition walls 11 extending in the longitudinal direction into a plurality of refrigerant passages 12.

The heat exchanger 1 is manufactured as follows. The aforementioned heat exchanging tubes 10 and fines 20 are stacked alternatively and the opposite ends of the heat exchanging tubes are inserted in the corresponding insertion slots formed in the headers 2 to form a provisionally assembled core portion 3. Furthermore, side plates 4 and 4 are provisionally assembled to the core portion 3. Then, this provisional assembly is integrally brazed in a furnace.

In the fin 20, the widthwise one side portion 20a thereof is set to be higher in pitting potential than the other side portion 20b thereof so that the other side portion 20a can be preferentially corroded to thereby give cathodic protection to the one side portion 20a of the fin 20. Due to this cathodic protection, the one side portion 20a of the fin 20 can be maintained in strength even if the fin 20 is corroded to some extent.

The pitting potential difference should fall within the range of from 40 to 200 mV. If the pitting potential difference is less than 40 mV, the cathodic protection cannot be attained, which makes it difficult to give corrosion protection to the one side portion 20a of the fin 20. On the other hand, if the pitting potential difference exceeds 200 mV, quick corrosion occurs to cause corrosion of the one side portion 20a, resulting in deteriorated fin strength. The preferable pitting potential difference is 50 to 150 mV.

The aforementioned pitting potential difference can be preferably attained by changing the Zn concentration in an aluminum alloy constituting the fin 20, i.e., setting the Zn concentration at the other side portion 20b of the fin 20 to be relatively higher than the one side portion 20a thereof. In this case, it is preferable that the Zn concentration difference is 0.4 mass % or more because of the following reasons. If it is less than 0.4 mass %, only small pitting potential difference can be obtained, resulting in insufficient cathodic protection. The preferable Zn concentration difference is 0.6 mass % or more. Although the present invention does not limit the upper limit of the Zn concentration difference, the preferable Zn concentration difference is 2.5 mass % or less to avoid excessive corrosion of the other side portion 20b of the fin 20.

The following compositions can be recommended as fin compositions with the aforementioned pitting potential difference.

The one side portion 20a of the fin 20 is preferably made of an aluminum alloy consisting essentially of Mn: 0.8 to 2 mass %, Zn: 0.4 to 2 mass %, and the balance being Al and inevitable impurities. On the other hand, the other side portion 20b of the fin 20 is preferably made of an aluminum alloy consisting essentially of Mn: 0.8 to 2 mass %, Zn: 1.5 to 3 mass %, and the balance being Al and inevitable impurities.

In the aforementioned alloy compositions, Mn is an essential element for enhancing fin strength and attaining buckling resistance at high temperature. If the Mn concentration is less than 0.8 mass %, the aforementioned effect is poor. However, if it exceeds 2 mass %, rough intermetallic compounds will be generated, resulting in deteriorated workability. The preferable Mn concentration is 0.9 to 1.7 mass %.

For the purpose of giving cathodic protection to the tube 10 by the fin 20, it is preferable that the one side portion 20a of the fin 20 also contains a small amount of Zn. The preferable Zn concentration in the one side portion 20a of the fin 20 is 0.4 to 2 mass % because of the following reasons. If it is less than 0.4 mass %, the cathodic protection effect is poor. However, if it exceeds 2 mass %, the pitting potential difference between the one side portion 20a and the other side portion 20b becomes smaller, resulting in poor cathodic protection effect at the one side portion 20a. More preferably, the Zn concentration in the one side portion 20a of the fin 20 falls within the rang of from 0.8 to 1.8 mass %. On the other hand, the preferable Zn concentration of the other side portion 20b of the fin 20 is 1.5 to 3 mass % because of the following reasons. If it is less than 1.5 mass %, the concentration difference between the one side portion 20a of the fin 20 and the other side portion 20b thereof is small, which makes it difficult to secure a prescribed pitting potential difference. On the other hand, if it exceeds 3 mass %, quick corrosion occurs to thereby cause corrosion of the one side portion 20a, resulting in deteriorated fin strength. More preferably, the Zn concentration in the other side portion 20b of the fin 20 falls within the range of from 1.8 to 2.7 mass %.

In the example shown in FIG. 2, one fin is disposed between adjacent tubes 10 and 10. This fin 20 is differentiated in Zn concentration between the one side portion 20a of the fin 20 and the other side portion 20b thereof, and therefore there is pitting potential difference therebetween. In this invention, as shown in FIG. 3, two separated fins different in pitting potential due to differentiated Zn concentration, one side fin 21a with higher pitting potential and the other side fin 21b with lower pitting potential, can be disposed in parallel between the adjacent tubes 10 along the longitudinal direction of the tube 10. In this alternative example, the preferable compositions of the aluminum alloy constituting the one side fin 21a and the other side fin 20b can be the same as those constituting the one side portion 20a of the fin 20 and the other side portion 20b of the fin 20 shown in FIG. 2.

In the case of employing the aforementioned two fins 21a and 21b to be disposed between adjacent tubes 10 and 10, it is preferable that the distance D between the adjacent fins is 3 mm or less, more preferably 2 mm or less.

The thickness of the fin 20, 21a and 21b is preferably set to 100 μm or less so as to secure fin strength even after an occurrence of corrosion and obtain lightness, heat releasing performance and workability. More preferably, the thickness of the fin falls within the range of from 50 to 90 μm.

In this invention, there are two types of fins. In one type, a fin is constituted by two portions clearly different in pitting potential, one portion with higher pitting potential and the other portion with lower pitting potential. In the other type, pitting potential gradually changes from one side portion to the other side portion of a fin. Accordingly, there are two types from the view point of Zn concentration. That is, in one type, a fin is constituted by two portions clearly different in Zn concentration, one portion with high Zn concentration and the other portion with low Zn concentration. In the other type, the Zn concentration gradually changes from one side portion to the other side portion. It should be noted that both types fall within the scope of the present invention.

In the heat exchanger according to the present invention, even if corrosion occurs to some extent, the one side portion can be maintained in fin strength than the other side portion over a long period. Therefore, this heat exchanger is suitable for a heat exchanger to be disposed at a location where strength and durability are required at one side of the core portion. For example, in a heat exchanger mounted in a vehicle such as an automobile, since chippings occur at the front side of the core portion, it is required that the front side of the fin is higher in strength than the rear side thereof. Accordingly, it is possible to cope with chippings and fin damages by installing the heat exchanger according to the present invention with one side of the core portion, i.e., one side portion of the fin with high pitting potential, facing frontward and the other side facing rearward.

In manufacturing the heat exchanger according to the present invention, there are various methods for differentiating Zn concentration between one side portion of the fin and the other side portion of the fin. The present invention allows any one of methods for differentiating Zn concentration, and does not limit to any one of them.

The Zn concentration in the aluminum alloy constituting the fin after brazing is decided by the sum of the Zn amount contained in the fin composition before brazing, the Zn amount supplied from outside during the brazing and the decreased amount of Zn evaporated by the heat during the brazing.

The alloy composition of the fin before brazing can be arbitrarily adjusted at the time of casting the material. Accordingly, in manufacturing the heat exchanger using two pieces of fins 21a and 21b as shown in FIG. 3, two types of fins, one side fin 21a with lower Zn concentration and the other side fin 21b with higher Zn concentration, are manufactured, and then disposed between adjacent tubes 10 and 10 along the longitudinal direction of the tube to obtain a provisionally assembled core portion 3. Then, this provisionally assembled core portion 3 is brazed in accordance with any known method. As a result, a heat exchanger having a fin different in Zn concentration between the one side portion and the other side portion can be manufactured.

As a method of supplying Zn from outside at the time of brazing, a method shown in FIG. 2 can be exemplified. In this method, tubes 10 and fins 20 are disposed alternatively to form a provisionally assembled core portion 3. Then, this provisionally assembled core portion 3 is brazed in a state in which a Zn inclusion, such as an Al—Zn alloy plate, a Zn plate, or Zn powder, is disposed near the other side of the core portion 3, i.e., the rear side of the core portion when mounted to a vehicle. In the illustrated example, an Al—Zn alloy plate 30 is used. In this method, Zn evaporates from the Zn inclusion by heating, and the evaporated Zn adheres to the heated fin 20. Then, the Zn will diffuse in the fin 20. The amount of Zn to be given to the fin 20 is influenced by the surface area of the Zn inclusion, the Zn concentration of the Zn inclusion, the distance between the Zn inclusion and the core portion 3. Therefore, the Zn concentration of the fin 20 becomes high at the other side portion 20b near the Zn inclusion and gradually decreases toward the one side portion 20a. In cases where you do not wish to fuse the Zn inclusion at the time of brazing, it is preferable to use an Al—Zn alloy plate, especially an Al—Zn alloy plate containing Zn: 5 to 50 mass %. The amount of Zn to be given to the fin 20 can be adjusted by the Zn content in the Al—Zn alloy plate 30 and the distance from the core portion 3.

In the case of using a Zn sprayed tube 10, the Zn evaporated from the sprayed layer will be supplied to the fin. However, since the sprayed layer is evenly given to the tube 10 in the widthwise direction, the Zn will be evenly supplied to the fin in the widthwise direction thereof. Accordingly, it is considered that the Zn would barely exert an influence on forming pitting potential difference between the one side portion 20a and the other side portion 20b, though the Zn may exert an influence on pitting potential.

Furthermore, the Zn contained in the fin 20 before brazing will evaporate to be decreased by heating at the brazing operation. Accordingly, controlling the evaporation amount of Zn at the other side portion 20b of the fin 20 can make Zn concentration difference in the fin 20. In concrete, flux is applied only to the other side portion 20b of the fin 20 constituting the provisionally assembled core portion 3 and then the provisionally assembled core portion 3 is heated to be brazed. As a result that the Zn evaporation from the fin 20 is restrained at the other side portion 20b, the Zn concentration becomes relatively low at the one side portion 20a and relatively high at the other side portion 20b.

Examples of the aforementioned flux include $KF$—$AlF_3$ composite, $KAlF_4$, $K_2AlF_5$, $K_3AlF_6$, $AlF_3$, $CsF$, $BiF_3$, $LiF$, $KZnF_3$, $ZnF_2$, and $ZnCl_2$. Among other things, in the case of using flux containing Zn, since the Zn contained in the flux will diffuse into the fin, in addition to the aforementioned evaporation restraining effect, an effect of enhancing the Zn concentration in the fin can be attained. The flux applying method is not specifically limited, and can be performed by any well-known method such as an immersion coating and a spraying method.

The aforementioned Zn adding or Zn evaporation restraining by partially applying flux at the time of brazing can be performed independently or in combination with disposing the Al—Zn alloy plate 30 near the core portion 3 to which flux is partially applied. Although the above explanation is directed to the case in which a single fin 20 is disposed between adjacent tubes 10 and 10, the aforementioned processing can also be applied to the case in which two separated fins different in Zn concentration are used to form the one side fin 21a with lower Zn concentration and the other side fin 21b with higher Zn concentration. Furthermore, the Zn adding and/or the Zn evaporation restraining can be executed against two fins different in Zn concentration, which increases the Zn concentration difference therebetween.

In the heat exchanger manufacturing method according to the present invention, since Zn can be given to the fin by using the Al—Zn alloy plate or the Zn contained flux, pitting potential difference can be attained even in the case in which no Zn is contained in the fin material before brazing. However, in order to attain a prescribed Zn concentration difference and therefore to create a predetermined pitting potential difference, it is preferable that a fin is manufactured using Zn contained aluminum alloy and then Zn concentration of the fin is adjusted by the aforementioned method at the time of brazing.

In the heat exchanger and the manufacturing method according to the present invention, it is preferable to use JIS 1xxx series aluminum alloy, aluminum alloy containing small amount of Cu and Mn, and JIS 3xxx series aluminum alloy, as the material of the tube. Furthermore, a tube in which a brazing layer is formed on a core material made of the aforementioned aluminum alloy, or a Zn sprayed tube as a corrosion resistance tube can also be used arbitrarily. As for the fin, a bare fin with no brazing material clad or a brazing fin with brazing material clad can be used.

EXAMPLES

Next, concrete examples of heat exchangers according to the present invention will be explained.

As a tube material, using aluminum alloy consisting of Cu: 0.4 mass %, Mn: 0.2 mass % and the balance being Al and inevitable impurities, flat multi-bored tubes as shown in FIGS. 2 and 3 were extruded, and then Zn was thermally sprayed on both flat portions of each tube immediately after the extrusion to thereby obtain Zn sprayed tubes 10. In the following Examples and Comparative Examples, these Zn sprayed tubes 10 were commonly used. As a fin, a brazing fin with a total thickness of 100 μm in which a 10 μm thick Al—Si series alloy brazing material was clad on both surfaces of an 80 μm thick core material made of various compositions containing Zn and Mn was used.

Example 1, Comparative Examples 2 & 3

As shown in FIG. 3, two fins different in fin core composition, one side fin 21a and the other side fin 21b, were disposed between the adjacent tubes 10 and 10 along the longitudinal direction of the tube 10 with a fin distance D of 1.5 mm to obtain a provisionally assembled core portion 3.

$KAl_4$ as flux was applied to the entire provisionally assembled core portion 3 by spraying, and then the core portion 3 was subjected to heating of 600° C.×10 min in a brazing furnace to braze the tube 10 and fins 21a and 21b.

In Table 1 shown below, the fin core compositions of the one side fin 21a and the other side fin 21b and the Zn concentration difference in these compositions after the brazing are shown.

Examples 2, 5, 6 & 8

As shown in FIG. 2, a single fin 20 was disposed between the adjacent tubes 10 and 10 to thereby obtain a provisionally assembled core portion 3.

$KAl_4$ as flux was applied to the entire provisionally assembled core portion 3 by spraying, and then the core portion 3 was subjected to heating of 600° C.×10 min in a brazing furnace in a state in which an Al-20% Zn alloy plate 30 was disposed 10 mm apart from the one side of the core portion 3. In this heating for brazing, the Zn evaporated from the Al—Zn alloy plate 30 adhered to the fin 20 and then diffused into the fin 20. Since the Zn diffusion amount becomes smaller as the distance from the Al—Zn alloy plate 30 increases, the Zn concentration along the widthwise direction of the Zn diffusion amount became relatively lower at the one side portion 20a of the fin 20 apart from the Al—Zn alloy plate 30 and higher at the other side portion 20b of the fin 20 near the Al—Zn alloy plate 30.

In Table 1 shown below, the fin core compositions of the one side portion 20a of the fin 20 and the other side portion 20b of the fin 20 and the Zn concentration difference in these compositions after the brazing are shown.

Examples 3 & 4

As shown in FIG. 3, two separate fins 21a and 21b were disposed between the adjacent tubes 10 and 10 with a fin distance D of 1.5 mm to obtain a provisionally assembled core portion 3. Then, $KAl_4$ as flux was applied to the entire provisionally assembled core portion 3 by spraying.

Then, the core portion 3 was subjected to heating of 600° C.×10 min in a brazing furnace in a state in which the Al—Zn alloy plate 30 (shown in FIG. 2) was disposed near the one side fin 21b of the core portion 3 to braze the tube 10 and fins 21a and 21b.

In brazing the core portion 3, the core material composition of two fins before brazing, the Zn content of Al—Zn alloy plate 30 and the distance from the Al—Zn alloy plate to the core portion were adjusted. As a result, the fin core material compositions of the one side fin 21a and the other side fin 21b, the Zn concentration difference in the compositions after the brazing are shown in Table 1.

Example 7

As shown in FIG. 3, two fins 21a and 21b were disposed between the adjacent tubes 10 and 10 with a fin distance D of 1.5 mm to obtain a provisionally assembled core portion 3.

Then, $KZnF_3$ as flux was applied only to the other side fin 21b of the provisionally assembled core portion 3 by spraying, and then the provisionally assembled core portion 3 was subjected to heating of 600° C.×10 min in a brazing furnace to braze the tube 10 and fins 21a and 21b.

During the brazing of the core portion 3, since the Zn evaporation in the other side fin 21b was restrained by the flux applied on the other side fin 21b, the fin core material composition at the one side fin 21a and the other side fin 21b and the Zn concentration difference in the composition after the brazing became as shown in Table 1.

Comparative Example 1

As shown in FIG. 2, a single fin 20 was disposed between the adjacent tubes 10 and 10 to obtain a provisionally assembled core portion 3.

Then, $KAl_4$ as flux was applied to the entire provisionally assembled core portion 3 by spraying, and then the provisionally assembled core portion 3 was subjected to heating of 600° C.×10 min in a brazing furnace to braze the tube 10 and fins 21a and 21b.

By the heating for brazing, the fin core material composition at the one side portion 20a of the fin 20 and the other side portion 20b of the fin 20 after the brazing became as shown in Table 1.

[Method of Measuring Pitting Potential Difference]

As to each heat exchanger manufactured as mentioned above, the pitting potential difference between the one side portion 20a and the other side portion 20b of the fin 20 was measured. In Examples 1, 3, 4 and 7 and Comparative Example 1, the pitting potential was measured in the state in which only the non-louvered portions located at both ends shown by the reference numerals 22a and 22b in FIG. 2 were exposed, and the difference thereof was obtained. The pitting potential measurement was performed in a water solution of 2.67% $AlCl_3$ at the potential sweep rate of 20 mV/min.

[Corrosion Test]

To each heat exchanger manufactured as mentioned above, SWAAT test defined in ASTM-G85-A3 was performed. In the test, using corrosion test liquid adjusted to pH 3 by adding acetic acid to artificial sea water by ASTM D1141, a cycle of spraying the corrosion test liquid for 0.5 hour and leaving the wet state for 1.5 hours was repeated for 200 hours.

[Method of Measuring Fin Strength]

After the corrosion test, the heat exchanger was cut into halves at the widthwise central portion of the tube to obtain one side portion 20a of the fin 20 with higher pitting potential and the other side portion 20b of the fin 20 with lower pitting potential. The tensile strength of each of the one side portion 20a and the other side portion 20b was measured. The measuring of the tensile strength was performed while holding the tube 10. The measured tensile strength in Comparative Example 1 was used as a standard, and the results are shown as follows:

"×": the tensile strength was less than 1.0 times of the tensile strength in Comparative Example;

"○": the tensile strength was larger than 1.0 times of the tensile strength in Comparative Example but less than 1.5 times thereof; and "⊚": the tensile strength was more than 1.5 times of the tensile strength in Comparative Example.

BROAD SCOPE OF THE PRESENT INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the

TABLE 1

| | | | Composition of one side portion (one side fin) (mass %)* | | Composition of the other side portion (the other side fin) (mass %)* | | Zn concentration difference | Zn concentration difference | Pitting potential difference | Tensile strength of one side portion |
|---|---|---|---|---|---|---|---|---|---|---|
| | | Fin | Zn | Mn | Zn | Mn | forming method | (mass %) | (mV) | (fin) |
| Example | 1 | 2 pieces | 1.2 | 1.5 | 2 | 1.5 | Fin composition before brazing | 0.8 | 120 | ⊚ |
| | 2 | 1 piece | 1.2 | 1.5 | 1.7 | 1.5 | Al—Zn plate | 0.5 | 40 | ⊚ |
| | 3 | 2 pieces | 1 | 1.5 | 2.5 | 1.5 | Al—Zn plate | 1.5 | 180 | ⊚ |
| | 4 | 2 pieces | 1 | 1.3 | 2 | 1.3 | Al—Zn plate | 1 | 150 | ⊚ |
| | 5 | 1 piece | 1 | 1.8 | 1.5 | 1 | Al—Zn plate | 0.5 | 50 | ⊚ |
| | 6 | 1 piece | 1.8 | 1.5 | 2.5 | 1.5 | Al—Zn plate | 0.7 | 80 | ⊚ |
| | 7 | 2 pieces | 2 | 1.5 | 2.5 | 1.5 | Flux partially sprayed | 0.5 | 40 | ⊚ |
| | 8 | 1 piece | 2.1 | 1.5 | 2.6 | 1.5 | Al—Zn plate | 0.4 | 40 | ○ |
| Comp. Ex. | 1 | 1 piece | 2.5 | 1.5 | 2.5 | 1.5 | — | 0 | 0 | X |
| | 2 | 2 pieces | 2.4 | 1.5 | 2.5 | 1.5 | Fin composition before brazing | 1.5 | 20 | X |
| | 3 | 2 pieces | 1 | 1.5 | 3.5 | 1.5 | Fin composition before brazing | 1.5 | 300 | X |

*the balance being Al and inevitable impurities

From the results shown in Table 1, it is confirmed that the fin strength at the one side portion with higher pitting potential can be restrained even after an occurrence of corrosion and therefore certain strength can be maintained by forming a pitting potential difference between the one side portion of the fin and the other side portion of the fin along the widthwise direction.

Accordingly, in cases where the heat exchanger according to each embodiment is used for an automobile air-conditioner, by installing the heat exchanger to a vehicle such that the one side portion of the fin with higher strength faces toward the front side of the vehicle, it becomes possible to prevent or delete fin damages due to chippings.

INDUSTRIAL APPLICABILITY

The heat exchange can maintain the strength at the one side portion of the fin even if corrosion occurs to same extent since cathodic protection is given to the one side portion of the fin. Therefore, the heat exchanger can be preferably utilized as a heat exchanger for use in a vehicle such as an automobile.

claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

The invention claimed is:

1. A heat exchanger having a core portion in which aluminum flat tubes and aluminum fins are disposed alternatively and brazed with each other, each fin having a one side portion located at one side of the tube and the other side portion located at the other side of the tube,
   wherein the one side portion of the fin is higher in pitting potential than the other side portion of the fin, and
   wherein the pitting potential difference between the one side portion of the fin and the other side portion of the fin is 40 to 200 mV.

2. The heat exchanger as recited in claim 1, wherein the pitting potential difference is created by Zn concentration difference in aluminum alloy constituting the fin.

3. The heat exchanger as recited in claim 2, wherein the Zn concentration difference is 0.4 mass % or more.

4. The heat exchanger as recited in claim 1, wherein the one side portion of the fin and the other side portion of the fin are constituted by separated fins consisting of one side fin located at one side of the tube and the other side fin located at the other side of the tube, the separated fins being disposed with a distance therebetween along the longitudinal direction of the tube.

5. The heat exchanger as recited in claim 4, wherein the distance between the one side fin and the other side fin is 3 mm or less.

6. The heat exchanger as recited in claim 4, wherein the one side fin is made of aluminum alloy consisting essentially of Mn: 0.8 to 2 mass %, Zn: 0.4 to 2 mass %, and the balance being Al and inevitable impurities, and wherein the other side fin is made of aluminum alloy consisting essentially of Mn: 0.8 to 2 mass %, Zn: 1.5 to 3 mass %, and the balance being Al and inevitable impurities.

7. The heat exchanger as recited in claim 1, wherein the one side portion of the fin and the other side portion of the fin are made of an integrated single fin, wherein pitting potential difference is formed between the one side portion and the other side portion.

8. The heat exchanger as recited in claim 7, wherein the one side portion of the fin is made of aluminum alloy consisting essentially of Mn: 0.8 to 2 mass %, Zn: 0.4 to 2 mass %, and the balance being Al and inevitable impurities, and wherein the other side portion of the fin is made of aluminum alloy consisting essentially of Mn: 0.8 to 2 mass %, Zn: 1.5 to 3 mass %, and the balance being Al and inevitable impurities.

9. The heat exchanger as recited in claim 1, wherein the fin has a thickness of 100 μm or less.

10. A heat exchanger for use in a vehicle, the heat exchanger having a core portion in which aluminum tubes and aluminum fins are disposed alternatively and brazed with each other, each fin having one side portion located at one side of the tube and the other side portion located at the other side of the tube,
    wherein the one side portion of the fin is higher in pitting potential than the other side portion of the fin,
    wherein the pitting potential difference between the one side portion of the fin and the other side portion of the fin is 40 to 200 mV, and
    wherein the heat exchanger is installed on a vehicle with the one side portion of the fin with higher pitting potential facing toward a front side of the vehicle and the other side portion of the fin with lower pitting potential facing toward a rear side of the vehicle.

11. A method of manufacturing a heat exchanger having a core portion in which aluminum flat tubes and aluminum fins are disposed alternatively and brazed with each other, each fin having one side portion located at one side of the tube and the other side portion located at the other side of the tube, the one side portion of the fin being higher in pitting potential than the other side portion of the fin,
    the method, comprising the steps of:
    provisionally assembling a core portion by alternatively disposing the tubes and the fins; and
    heating the provisionally assembled core portion in a furnace to braze the tubes and the fins.

12. The heat exchanger as recited in claim 5, wherein the one side fin is made of aluminum alloy consisting essentially of Mn: 0.8 to 2 mass %, Zn: 0.4 to 2 mass %, and the balance being Al and inevitable impurities, and wherein the other side fin is made of aluminum alloy consisting essentially of Mn: 0.8 to 2 mass %, Zn: 1.5 to 3 mass %, and the balance being Al and inevitable impurities.

13. A method of manufacturing a heat exchanger having a core portion in which aluminum flat tubes and aluminum fins are disposed alternatively and brazed with each other, each fin having one side portion located at one side of the tube and the other side portion located at the other side of the tube, the one side portion of the fin being higher in pitting potential than the other side portion of the fin,
    the method, comprising the steps of:
    provisionally assembling a core portion by alternatively disposing the tubes and the fins; and
    heating the provisionally assembled core portion in a furnace in a state in which an Al—Zn alloy plate is disposed neat the other side portion of the fin to braze the tubes and the fins.

14. A method of manufacturing a heat exchanger having a core portion in which aluminum flat tubes and aluminum fins are disposed alternatively and brazed with each other, each fin having one side portion located at one side of the tube and the other side portion located at the other side of the tube, the one side portion of the fin being higher in pitting potential than the other side portion of the fin,
    the method, comprising the steps of:
    provisionally assembling a core portion by alternatively disposing the tubes and the fins;
    applying flux only to the other side portion of the fin of the provisionally assembled core portion; and
    heating the provisionally assembled core portion to which the flux is applied to the other side portion of the fin in a furnace to braze the tubes and the fins.

* * * * *